US010601585B1

(12) United States Patent
Robinson et al.

(10) Patent No.: US 10,601,585 B1
(45) Date of Patent: Mar. 24, 2020

(54) METHODS AND APPARATUS FOR BLOCKCHAIN ENCRYPTION

(71) Applicant: EMC IP Holding Company LLC, Hopkinton, MA (US)

(72) Inventors: Peter Robinson, Enoggera Reservoir (AU); Eric Young, Annerley (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 15/381,832

(22) Filed: Dec. 16, 2016

(51) Int. Cl.
H04L 9/14 (2006.01)
H04L 9/06 (2006.01)
H04L 9/32 (2006.01)
H04L 9/08 (2006.01)
H04L 9/30 (2006.01)

(52) U.S. Cl.
CPC .......... H04L 9/0637 (2013.01); H04L 9/0625 (2013.01); H04L 9/085 (2013.01); H04L 9/0869 (2013.01); H04L 9/14 (2013.01); H04L 9/3026 (2013.01); H04L 9/3247 (2013.01)

(58) Field of Classification Search
CPC ..... H04L 9/0637; H04L 9/0625; H04L 9/085; H04L 9/0869; H04L 9/14; H04L 9/3026; H04L 9/3247
USPC ........................................................ 713/176
See application file for complete search history.

(56) References Cited

U.S. PATENT DOCUMENTS

| 8,938,615 | B2* | 1/2015 | Neill | H04L 9/3066 340/10.1 |
| 9,455,968 | B1* | 9/2016 | Machani | H04W 12/04 |
| 2004/0158715 | A1* | 8/2004 | Peyravian | H04L 9/0844 713/171 |
| 2008/0150702 | A1* | 6/2008 | Neill | H04L 9/3066 340/10.42 |
| 2012/0278628 | A1* | 11/2012 | Chen | G06F 21/6254 713/176 |

(Continued)

FOREIGN PATENT DOCUMENTS

WO WO-2016145384 A1 * 9/2016 ........... H04L 9/3242

OTHER PUBLICATIONS

Daniel Miessler, A Blockchain Primer, https://danielmiessler.com/study/blockchain/#gs.BdrZ5t8, 1999-2016, pp. 1-6.

(Continued)

Primary Examiner — Harunur Rashid
Assistant Examiner — Sakinah White Taylor
(74) Attorney, Agent, or Firm — Ryan, Mason & Lewis, LLP

(57) ABSTRACT

Blockchain encryption techniques are provided. An exemplary method includes sending a signed transaction with at least two users to a blockchain; obtaining, by a first user, a public key of a second user from the blockchain; generating, by the first user, a symmetric key by combining a private key of the first user and the public key of the second user; encrypting, by the first user, a data item using the symmetric key; and providing the encrypted data item to the blockchain. The second user obtains the encrypted data item and a public key of the first user from the blockchain, and decrypts the encrypted data item using the symmetric key generated, by the second user, by combining a private key of the second user and the public key of the first user.

20 Claims, 6 Drawing Sheets

200 a. User A and User B Send Transaction to Contract, Placing Their Public Keys in Contract
b. User A Downloads Public Key of User B
c. User A Generates Random Number, $SALT_1$
d. User A Performs Key Agreement Operation:
Symmetric Key = KDF(Combine(UserA privateKey x UserB publicKey, $SALT_1$))
e. User A Encrypts Their Data Using Symmetric Encryption Technique; $SALT_1$ is Appended to Encrypted Data
f. User A Sends Signed Transaction to Contract, Placing Encrypted Data in Contract
g. User B Sends Transaction to Contract, Fetching Encrypted Data From Contract.
h. User B Fetches Public Key of User A
i. User B Performs Key Agreement Operation:
Symmetric Key = KDF(Combine(UserA publicKey x UserB privateKey, $SALT_1$)).
j. User B Decrypts Data.

(56) References Cited

U.S. PATENT DOCUMENTS

| | | | |
|---|---|---|---|
| 2015/0200774 A1* | 7/2015 | Le Saint | H04L 9/0844 |
| | | | 713/171 |
| 2016/0294783 A1* | 10/2016 | Piqueras Jover | H04L 63/0442 |
| 2016/0342977 A1* | 11/2016 | Lam | G06Q 20/02 |
| 2017/0178127 A1* | 6/2017 | Kravitz | G06Q 20/38215 |
| 2018/0121918 A1* | 5/2018 | Higgins | G06Q 20/065 |
| 2018/0183768 A1* | 6/2018 | Lobban | H04L 63/0435 |
| 2019/0220831 A1* | 7/2019 | Rangarajan | H04L 9/0825 |

OTHER PUBLICATIONS

Ethereum, Command Line Tools, Geth & Eth, Command Line Tools for the Ethereum Network, https://www.ethereum.org/cli, 2016, pp. 1-11.

Ethereum Project, Build Unstoppable Applications, https://www.ethereum.org/, 2016, pp. 1-6.

Satoshi Nakamoto, Bitcoin: A Peer-to-Peer Electronic Cash System, 2008, pp. 1-9.

\* cited by examiner

200 a. User A and User B Send Transaction to Contract, Placing Their Public Keys in Contract
b. User A Downloads Public Key of User B
c. User A Generates Random Number, $SALT_1$
d. User A Performs Key Agreement Operation:
   Symmetric Key = KDF(Combine(UserA privateKey x UserB publicKey, $SALT_1$))
e. User A Encrypts Their Data Using Symmetric Encryption Technique; $SALT_1$ is Appended to Encrypted Data
f. User A Sends Signed Transaction to Contract, Placing Encrypted Data in Contract
g. User B Sends Transaction to Contract, Fetching Encrypted Data From Contract.
h. User B Fetches Public Key of User A
i. User B Performs Key Agreement Operation:
   Symmetric Key = KDF(Combine(UserA publicKey x UserB privateKey, $SALT_1$)).
j. User B Decrypts Data.

FIG. 2 a. User A Generates Randomly Generated Symmetric Key, SymmetricKey2
b. User A Uses Threshold Sharing Scheme to Split SymmetricKey2, Such That M of N Participants are Needed to Reconstruct SymmetricKey2
c. User A Uses Symmetric Key2 to Encrypt Their Data Using Symmetric Encryption Technique
d. User A Sends Transaction to Contract, Placing Encrypted Data in Contract
e. User A Encrypts Key Splits, Distributing Them to N Participants Using Blockchain Encryption Process 200 (FIG. 2)
f. To Decrypt Data, M-1 of N Participants Need to Decrypt Their Key Splits and Put Plain Text Splits Into Contract.
g. Any of Other N-M+1 Users Can Download Plaintext M-1 Splits and Recover SymmetricKey2, and Then Decrypt Encrypted Data.

FIG. 6

METHODS AND APPARATUS FOR BLOCKCHAIN ENCRYPTION

FIELD

The field relates generally to computer networks, and more particularly, to techniques for storing encrypted data on a blockchain.

BACKGROUND

Ethereum is a public blockchain-based distributed computing platform, featuring smart contract functionality. In an Ethereum blockchain, users have public/private key pairs and are identified by an account number (typically calculated as a hash of the public key of the user). Executable code is stored on the blockchain. Each grouping of executable code is often referred to as a contract or a smart contract. The code of a contract and the current and previous values of data held by a contract are public, and the contract code is immutable. Function calls on a contract are referred to as transactions. Transactions are signed by the private key of a user and include a signature, which is used to confirm that a given transaction originated from a given user.

There have been a number of security issues with contracts, in which contract bugs have led to unexpected issues. Thus, security of the data in a contract has to be carefully reviewed. A need therefore exists for improved techniques for storing encrypted data on a blockchain. A further need exists for techniques for threshold-based blockchain encryption.

SUMMARY

Illustrative embodiments of the invention provide techniques for blockchain encryption. An exemplary computer-implemented method comprises the steps of sending a signed transaction with at least two users to a blockchain; obtaining, by a first user, a public key of a second user from the blockchain; generating, by the first user, a symmetric key by combining a private key of the first user and the public key of the second user; encrypting, by the first user, a data item using the symmetric key; and providing, by the first user, the encrypted data item to the blockchain, wherein the second user obtains the encrypted data item and a public key of the first user from the blockchain, and wherein the second user decrypts the encrypted data item using the symmetric key generated, by the second user, by combining a private key of the second user and the public key of the first user. In one or more embodiments, the generation of the symmetric key further combines a random number, and the random number is appended to the encrypted data item in the blockchain.

In at least one embodiment, the encrypted data item comprises at least one encrypted key share generated using a secret sharing scheme applied to a second symmetric key, and a predefined number of decrypted versions of the at least one encrypted key share is needed to decrypt a second encrypted data item encrypted with the second symmetric key. The secret sharing scheme optionally comprises a hierarchical key splitting scheme that requires one or more predefined participants to provide a corresponding share. In one exemplary embodiment, M of N decrypted versions of the at least one encrypted key share are needed to decrypt the second encrypted data item, and wherein M−1 decrypted versions of the at least one encrypted key share are placed into the blockchain and any user holding a remaining (N−M+1) encrypted key share can decrypt the second encrypted data item. In another exemplary embodiment, M of N decrypted versions of the at least one encrypted key share are needed to decrypt the second encrypted data item, and M decrypted versions of the at least one encrypted key share are placed into the blockchain to decrypt the second encrypted data item.

These and other illustrative embodiments include, without limitation, methods, apparatus, networks, systems and processor-readable storage media.

BRIEF DESCRIPTION OF THE DRAWINGS

FIG. 2 illustrates exemplary pseudo code of a blockchain encryption process, according to one embodiment of the invention;

FIG. 6 illustrates exemplary pseudo code of the threshold-based blockchain encryption process of FIG. 5, according to one embodiment of the invention.

DETAILED DESCRIPTION

Illustrative embodiments of the present invention will be described herein with reference to exemplary computer networks and associated computers, storage devices, security appliances and other types of processing devices. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

In one or more embodiments, techniques are provided for storing encrypted data on a blockchain, without requiring external key management beyond individuals maintaining their own user private keys secure. In at least one embodiment, methods and apparatus are provided that allows at least two users to send encrypted data to each other securely via a contract. One exemplary embodiment uses a threshold secret sharing scheme to allow a user to require M of N participants to agree before encrypted data can be decrypted.

Blockchains are commonly associated with modern cryptocurrency, where the blockchain serves as a decentralized digital ledger for transactions. A peer-to-peer network and a distributed timestamping server are used to autonomously manage a blockchain database, in a known manner. Transactions are recorded in a blockchain in such a way that the registered transactions cannot be altered. In addition, transactions are signed by the private key of a user and include a signature, which is used to confirm that a given transaction originated from a given user.

Ethereum is a blockchain-based distributed computing platform, featuring smart contract functionality. Ethereum provides a decentralized virtual machine, referred to as the Ethereum Virtual Machine (EVM), that can execute peer-to-peer contracts. While one or more embodiments of the invention are implemented using an Ethereum Blockchain, the present invention can be implemented using other blockchains, as would be apparent to a person of ordinary skill in the art.

Figure 1:
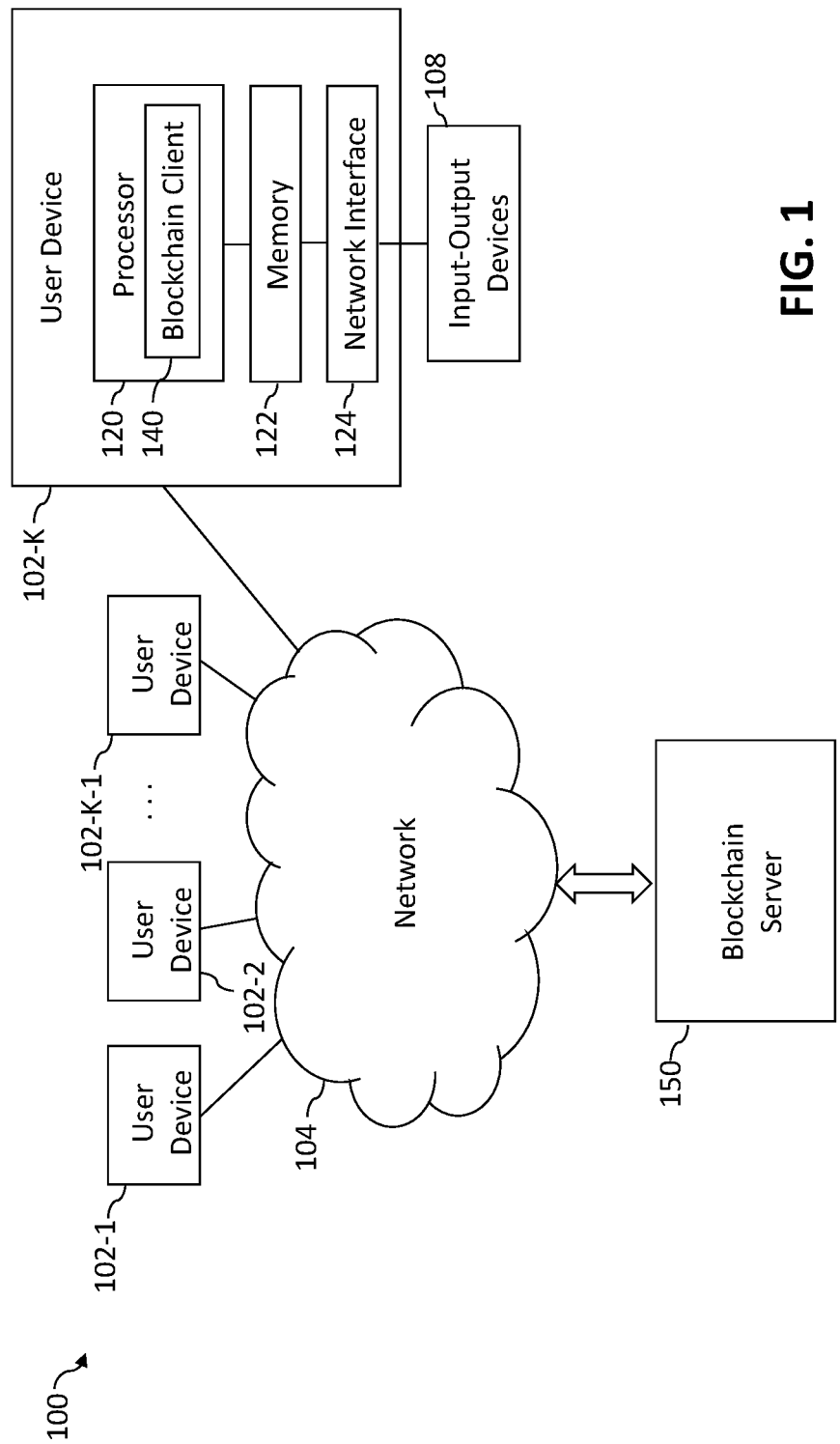
FIG. 1 is a block diagram of a computer network configured for blockchain encryption in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102, in some embodiments, comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using IP or other related communication protocols.

A blockchain server 150 is also connected to the network 104. The blockchain server 150 implements the server-side functionality discussed further below in conjunction with FIGS. 2-6.

The user device 102-K in the FIG. 1 embodiment is assumed to be implemented using at least one processing device. Each such processing device generally comprises at least one processor and an associated memory, and implements one or more functional modules for controlling certain features of the user device 102-K. More particularly, the user device 102-K in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements. The processor 120 further comprises a blockchain client 140. The blockchain client 140 implements the client-side functionality discussed further below in conjunction with FIGS. 2-6.

In one or more embodiments, the exemplary blockchain client 140 may be implemented, for example, using Ethereum clients. See, for example, "Geth & Eth, Command Line Tools for the Ethereum Network," Ethereum Foundation (2016), incorporated by reference herein in its entirety. Likewise, the exemplary blockchain server 150 may be implemented, for example, using an Ethereum server. "Ethereum Homestead Release, Blockchain App Platform: Build Unstoppable Applications," Ethereum Foundation (2016), incorporated by reference herein in its entirety. On a blockchain, any user can set up a node in a peer-to-peer network that replicates the necessary data for all nodes to reach an agreement and be compensated by users and app developers.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the user device 102-K to communicate over the network 104 with the other user devices 102 and with blockchain server 150, and illustratively comprises one or more conventional transceivers.

Also associated with the user device 102-K are input-output devices 108, which illustratively comprise keyboards, displays or other types of input-output devices in any combination. Such input-output devices are used to support one or more user interfaces to the user device 102-K, as well as to support communication between the user device 102-K and other related systems and devices not explicitly shown.

In one or more embodiments of the invention, outputs generated by the user device 102-K can be provided over the network 104 to one or more network security tools. Such devices can illustratively comprise one or more types of processing devices configured for communication over network 104 with the user device 102-K.

It is to be understood that the particular set of elements shown in FIG. 1 for implementing blockchain encryption is presented by way of illustrative example only, and in other embodiments additional or alternative elements may be used. Thus, another embodiment may include additional or alternative systems, devices and other network entities, as well as different arrangements of modules and other components.

FIG. 2 illustrates exemplary pseudo code of a blockchain encryption process 200, according to one embodiment of the invention. Generally, the exemplary blockchain encryption process 200 allows users to send encrypted data to each other securely via a contract, as discussed further below in conjunction with FIG. 3.

As shown in FIG. 2, during Step a, User A and User B send a transaction to the contract, placing their public keys in the contract. In Step b, User A downloads the public key of User B. In Step c, User A generates a random number, $SALT_1$. In Step d, User A performs a key agreement operation to generate a symmetric key, as follows:

Symmetric Key=KDF(Combine(User*A* privateKey×
 User*B* publicKey,$SALT_1$)), where KDF indicates a Key Derivation Function and the Combine function can be implemented, for example, using an XOR function, or a message digest. Generally, salt allows a number of items to be encrypted with the same keys and placed in the contract, but each is encrypted with a different derived key. The use of a key agreement with salt allows users to send encrypted data from one user to another user securely, and provide certainty that information has come from the originating user, in a manner that allows multiple messages to be sent from one user to another without compromising security.

In Step e, User A encrypts his or her data using a symmetric encryption technique, such as AES/GCM (Advanced Encryption Standard/Galois/Counter Mode), and $SALT_1$ is appended to encrypted data. In Step f, User A sends a signed transaction to the contract, placing the encrypted data in the contract. In Step g, User B sends a signed transaction to the contract, fetching the encrypted data from the contract.

In Step h, User B fetches the public key of User A and performs a key agreement operation in Step i, as follows:

Symmetric Key=KDF(Combine(User*A* publicKey×
 User*B* privateKey,$SALT_1$)).

In Step j, User B decrypts the encrypted data.

One or more embodiments of the blockchain encryption process 200 ensures that the information came from User A because otherwise the key agreement would not work. As noted above, the $SALT_1$ ensures that the symmetric key will be different each time.

Figure 3:
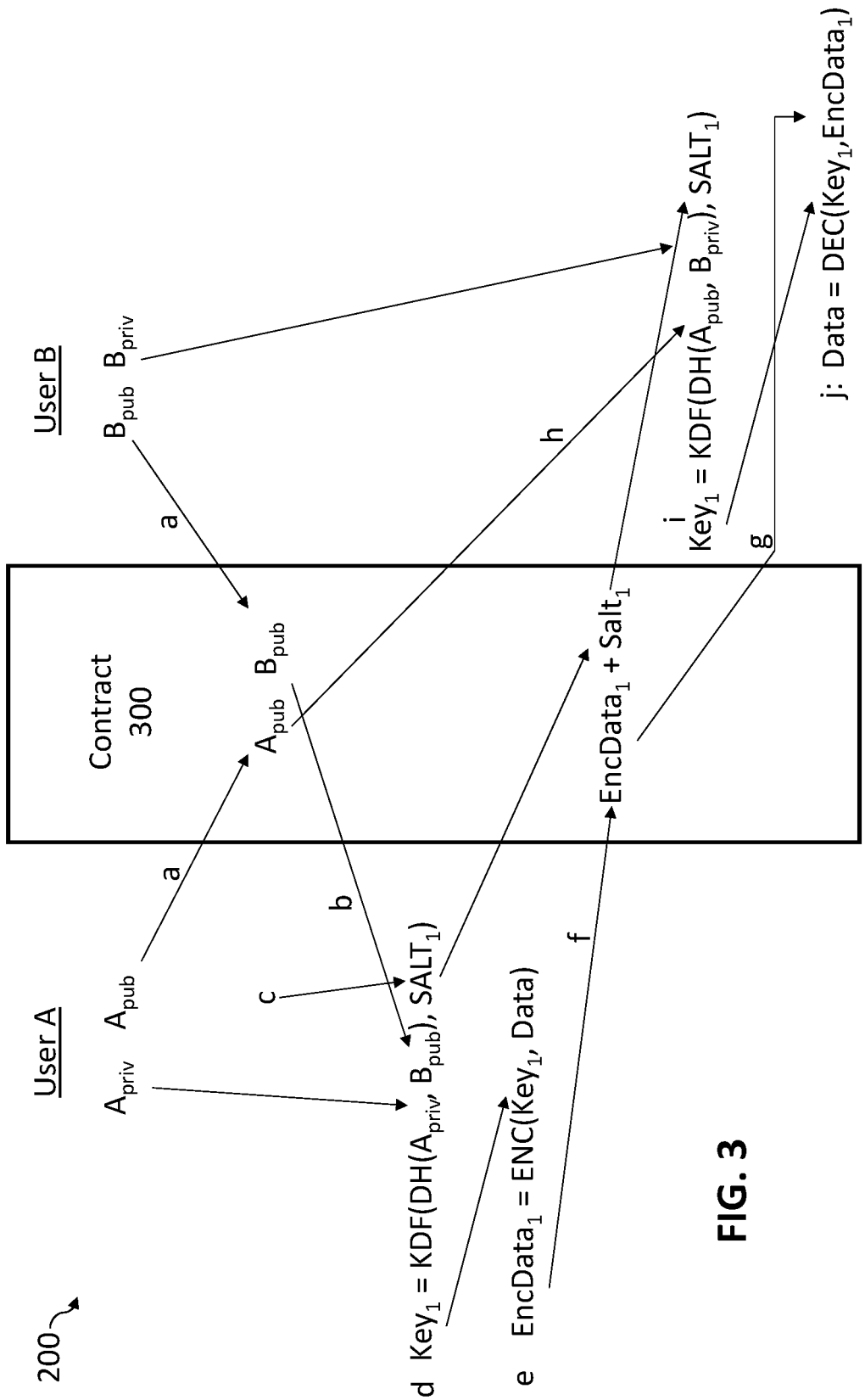
FIG. 3 is a flow diagram illustrating an exemplary implementation of the blockchain encryption process of FIG. 2, according to one embodiment of the invention.

FIG. 3 is a flow diagram illustrating an exemplary implementation of the blockchain encryption process of FIG. 2, according to one embodiment of the invention.

As shown in FIG. 3, during step a, users A and B place their public keys, $A_{pub}$, and $B_{pub}$, respectively, in a contract 300, bound to a certificate. During Step b, User A downloads the public key, $B_{pub}$, of User B. In Step c, User A generates a random number, $SALT_1$. In Step d, User A performs a key agreement operation to generate a symmetric key, as follows:

$Key_1$=KDF(DH($A_{priv}$,$B_{pub}$),$SALT_1$)), where KDF indicates a Key Derivation Function and the Combine function is implemented as a Diffie Hellman function.

In Step e, User A encrypts his or her data, using a symmetric encryption technique, such as AES/GCM. In Step f, $SALT_{1i}$ is appended to the encrypted data, $EncData_1$, and User A sends a signed transaction to the contract 300, placing the encrypted data in the contract 300. In Step g, User B sends a signed transaction to the contract 300, fetching the encrypted data, $EncData_1$, from the contract 300.

In Step h, User B fetches the public key, $A_{pub}$, of User A and performs a key agreement operation in Step i, as follows:

$Key_1$=KDF(DH($A_{pub}$,$B_{priv}$),$SALT_1$)).

In Step j, User B decrypts the encrypted data.

Figure 4:
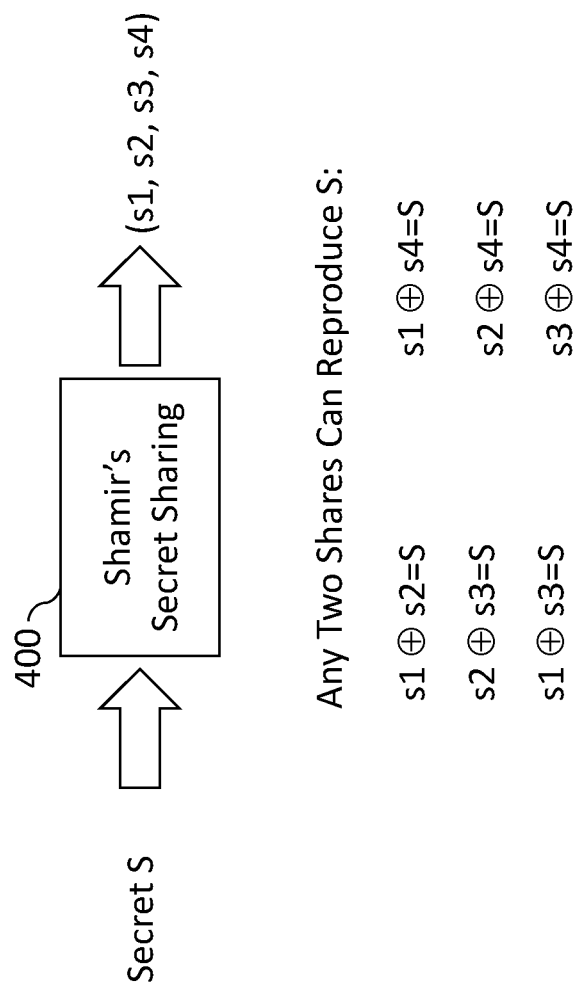
FIG. 4 illustrates an exemplary conventional secret sharing technique in which a polynomial secret sharing scheme is applied to a secret, S, to produce a plurality of secret shares.

FIG. 4 illustrates an exemplary conventional secret sharing technique in which a polynomial secret sharing scheme 400 is applied to a secret, S, to produce a plurality of secret shares. In one or more embodiments, another aspect of the invention applies threshold-based secret sharing to allow a user to require M of N participants to agree before encrypted data can be decrypted. In the embodiment of FIG. 4, two or more shares that are distributed are required to reconstruct the secret, S. In one exemplary implementation, a polynomial secret splitting scheme is employed, such as Shamir's polynomial secret sharing scheme. See, for example, Adi Shamir, "How to Share a Secret," Communications of the ACM, Vol. 22, No. 11, 612-13, (1979), incorporated by reference herein.

In FIG. 4, Shamir's polynomial secret sharing scheme 400 is applied to a Secret, S, to produce four secret shares s1, s2, s3, s4. As shown in FIG. 4, any two shares can reproduce the secret, S.

Figure 5:
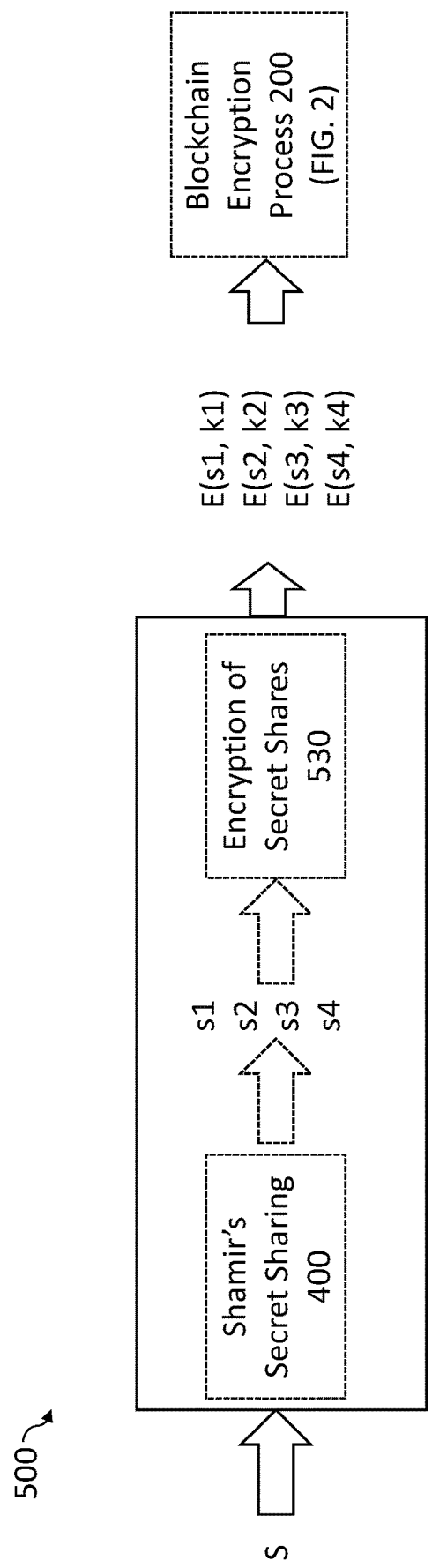
FIG. 5 is a flow diagram illustrating an exemplary implementation of a threshold-based blockchain encryption process, according to one embodiment of the invention.

FIG. 5 is a flow diagram illustrating an exemplary implementation of a threshold-based blockchain encryption process 500, according to one embodiment of the invention. Generally, the exemplary threshold-based blockchain encryption process 500 allows a user to send encrypted data to N other Users via a contract, securely. The data can only be decrypted if M users agree to allow the data to be decrypted. Thus, the exemplary threshold-based blockchain encryption process 500 uses a threshold scheme to allow a user to require M of N participants to agree before encrypted data can be decrypted.

As shown in FIG. 5, the exemplary threshold-based blockchain encryption process 500 applies Shamir's secret sharing technique 400 to a Secret, S, to produce four secret shares s1, s2, s3, s4. Thereafter, an encryption 530 is applied to the four shares s1, s2, s3, s4 to produce an encrypted set of shares, E(s1, k1), E(s2, k2), E(s3, k3) and E(s4, k4). The encrypted shares are then distributed using the blockchain encryption process 200 of FIG. 2.

Thus, in one exemplary embodiment, the encryption 530 applied to each of the four shares is with a different key. In this manner, anyone receiving a share cannot decrypt any other share they discover. In the notation of FIG. 5, k1, k2 . . . k4 are keys determined in a similar manner as step d of the blockchain encryption process 200 of FIG. 2. The shares put in the contract 300 have identifying metadata to specify who the share is intended for (the certificate).

Thus, in one or more embodiments, the following is placed in the contract 300:

$E(s1,\text{KDF}(\text{PrivA},\text{PubR1}))+\text{certR1},E(s2,\text{KDF}(\text{PrivA},$
 $\text{PubR2}))+\text{certR2}\ldots.$ Following execution of the exemplary threshold-based blockchain encryption process 500, N participants have 'shares' of the decryption key, distributed via the exemplary blockchain encryption process 200 of FIG. 2. If M−1 participants put their shares (splits) into the contract 300, any of the remaining (N−M+1) participants can decrypt the secret by using their share with the published shares.

Alternatively, M participants can put their shares into the contract, making the secret public to everyone. This could be used, for example, to make information public after it has been approved by M of N reviewers. In this case, the review information would be published (to the contract 300) encrypted and distributed to the reviewers directly (or again via the contract 300 using the exemplary blockchain encryption process 200). This alternative implementation could be used to make information public if M of N participants (reviewers) agree to do so. A hash of the encrypted information could be published in the contract to ensure that the distributed copy and the "M of N" protected version are the same.

In a further variation, the original user (User A) that splits the secret, S, can place M−1 shares in the contract 300, and any other participant can decrypt the secret by using their share with the published shares.

FIG. 6 illustrates exemplary pseudo code of the threshold-based blockchain encryption process of FIG. 5, according to one embodiment of the invention. As shown in FIG. 6, during step a, User A generates a randomly generated symmetric key, SymmetricKey2. During step b, User A uses a threshold sharing scheme to split SymmetricKey2, such that M of N participants are needed to reconstruct SymmetricKey2.

During step c, User A uses Symmetric Key2 to encrypt their data using a symmetric encryption technique, as discussed above, for example, in conjunction with FIG. 2. During step d, User A sends a transaction to the contract 300, placing the encrypted data in the contract 300. User A encrypts the key splits, during step e, distributing them to N participants using the blockchain encryption process 200 of FIG. 2.

To decrypt the data, M−1 of N participants need to decrypt their key splits during step f, and put plain text splits into the contract 300. At step g, any of the other N−M+1 users can download the plaintext M−1 splits and recover SymmetricKey2, and then decrypt the encrypted data.

In one variation, at step g, an Mth user can decrypt their key split and put the plain text split into the contract 300. Now, anyone can get all of the shares (splits) from the contract 300 and decrypt the encrypted data.

In yet another variation, hierarchical key splitting can be used by the threshold-based blockchain encryption process of FIG. 5. Thus, data could be decrypted only if M of N participants agree, plus a certain other participant or group or sub-group of participants.

The particular processing operations and other network functionality described in conjunction with the flow and communication diagrams of FIGS. 1-6 are presented by way of illustrative example only, and should not be construed as limiting the scope of the invention in any way. Alternative embodiments can use other types of processing operations for blockchain encryption. For example, the ordering of the process steps may be varied in other embodiments, or certain steps may be performed concurrently with one another rather than serially.

The above-described illustrative embodiments provide significant advantages relative to conventional approaches for storing encrypted data on a blockchain. For example, some embodiments are configured to allow users to send encrypted data to each other via a contract, securely.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker™ containers or other types of Linux® containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a Wi-Fi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE™, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method, comprising:
sending a signed transaction with at least two users to a blockchain;
obtaining, by a first user, a public key of a second user from said blockchain;
generating, by at least one processing device of said first user, responsive to the obtaining of the public key of said second user from said blockchain, a symmetric key by combining a private key of said first user and said obtained public key of said second user;
encrypting, by the at least one processing device of said first user, a data item using said symmetric key; and
providing, by the at least one processing device of said first user, said encrypted data item to said blockchain, wherein said second user obtains said encrypted data item and a public key of said first user from said blockchain, and wherein said second user decrypts said encrypted data item using said symmetric key generated, by said second user, responsive to the obtaining of the public key of said first user from said blockchain, by combining a private key of said second user and said obtained public key of said first user, wherein said blockchain comprises a contract for storing said transaction, said public key of one or more of said first and second user, and said encrypted data item.

2. The method of claim 1, wherein said generating said symmetric key by said first user further combines a random number, and wherein said random number is appended to said encrypted data item in said blockchain.

3. The method of claim 1, wherein said encrypted data item comprises at least one encrypted key share generated using a secret sharing scheme applied to a second symmetric key, and wherein a predefined number of decrypted versions of said at least one encrypted key share is needed to decrypt a second encrypted data item encrypted with said second symmetric key.

4. The method of claim 3, wherein said secret sharing scheme comprises a hierarchical key splitting scheme that requires one or more predefined participants to provide a corresponding share.

5. The method of claim 3, wherein N is a total number of decrypted versions of said at least one encrypted key share and M is a number of the N decrypted versions of said at least one encrypted key share that are needed to decrypt said second encrypted data item, and wherein M−1 decrypted versions of said at least one encrypted key share are placed into said blockchain and any user holding a remaining (N−M+1) encrypted key share can decrypt said second encrypted data item.

6. The method of claim 3, wherein N is a total number of decrypted versions of said at least one encrypted key share and M is a number of the N decrypted versions of said at least one encrypted key share that are needed to decrypt said second encrypted data item, and wherein M decrypted versions of said at least one encrypted key share are placed into said blockchain to decrypt said second encrypted data item.

7. A computer program product, comprising a tangible machine-readable storage medium having encoded therein executable code of one or more software programs, wherein the one or more software programs when executed by at least one processing device perform the following steps:
sending a signed transaction with at least two users to a blockchain;
obtaining, by a first user, a public key of a second user from said blockchain;
generating, by the at least one processing device of said first user, responsive to the obtaining of the public key of said second user from said blockchain, a symmetric key by combining a private key of said first user and said obtained public key of said second user;
encrypting, by the at least one processing device of said first user, a data item using said symmetric key; and
providing, by the at least one processing device of said first user, said encrypted data item to said blockchain, wherein said second user obtains said encrypted data item and a public key of said first user from said blockchain, and wherein said second user decrypts said encrypted data item using said symmetric key generated, by said second user, responsive to the obtaining of the public key of said first user from said blockchain, by combining a private key of said second user and said obtained public key of said first user, wherein said blockchain comprises a contract for storing said transaction, said public key of one or more of said first and second user, and said encrypted data item.

8. The computer program product of claim 7, wherein said generating said symmetric key by said first user further combines a random number, and wherein said random number is appended to said encrypted data item in said blockchain.

9. The computer program product of claim 7, wherein said encrypted data item comprises at least one encrypted key share generated using a secret sharing scheme applied to a second symmetric key, and wherein a predefined number of decrypted versions of said at least one encrypted key share is needed to decrypt a second encrypted data item encrypted with said second symmetric key.

10. The computer program product of claim 9, wherein said secret sharing scheme comprises a hierarchical key splitting scheme that requires one or more predefined participants to provide a corresponding share.

11. The computer program product of claim 9, wherein N is a total number of decrypted versions of said at least one encrypted key share and M is a number of the N decrypted versions of said at least one encrypted key share that are needed to decrypt said second encrypted data item, and wherein M−1 decrypted versions of said at least one encrypted key share are placed into said blockchain and any user holding a remaining (N−M+1) encrypted key share can decrypt said second encrypted data item.

12. The computer program product of claim 9, wherein N is a total number of decrypted versions of said at least one encrypted key share and M is a number of the N decrypted versions of said at least one encrypted key share that are needed to decrypt said second encrypted data item, and wherein M decrypted versions of said at least one encrypted key share are placed into said blockchain to decrypt said second encrypted data item.

13. A system, comprising:
a memory; and
at least one processing device, coupled to the memory, operative to implement the following steps:

sending a signed transaction with at least two users to a blockchain;

obtaining, by a first user, a public key of a second user from said blockchain;

generating, by the at least one processing device of said first user, responsive to the obtaining of the public key of said second user from said blockchain, a symmetric key by combining a private key of said first user and said obtained public key of said second user;

encrypting, by the at least one processing device of said first user, a data item using said symmetric key; and providing, by the at least one processing device of said first user, said encrypted data item to said blockchain, wherein said second user obtains said encrypted data item and a public key of said first user from said blockchain, and wherein said second user decrypts said encrypted data item using said symmetric key generated, by said second user, responsive to the obtaining of the public key of said first user from said blockchain, by combining a private key of said second user and said obtained public key of said first user, wherein said blockchain comprises a contract for storing said transaction, said public key of one or more of said first and second user, and said encrypted data item.

14. The system of claim 13, wherein said generating said symmetric key by said first user further combines a random number, and wherein said random number is appended to said encrypted data item in said blockchain.

15. The system of claim 13, wherein said encrypted data item comprises at least one encrypted key share generated using a secret sharing scheme applied to a second symmetric key, and wherein a predefined number of decrypted versions of said at least one encrypted key share is needed to decrypt a second encrypted data item encrypted with said second symmetric key.

16. The system of claim 15, wherein said secret sharing scheme comprises a hierarchical key splitting scheme that requires one or more predefined participants to provide a corresponding share.

17. The system of claim 15, wherein N is a total number of decrypted versions of said at least one encrypted key share and M is a number of the N decrypted versions of said at least one encrypted key share that are needed to decrypt said second encrypted data item.

18. The system of claim 17, wherein M−1 decrypted versions of said at least one encrypted key share are placed into said blockchain and any user holding a remaining (N−M+1) encrypted key share can decrypt said second encrypted data item.

19. The system of claim 15, wherein N is a total number of decrypted versions of said at least one encrypted key share and M is a number of the N decrypted versions of said at least one encrypted key share that are needed to decrypt said second encrypted data item.

20. The system of claim 19, wherein M decrypted versions of said at least one encrypted key share are placed into said blockchain to decrypt said second encrypted data item.

* * * * *